United States Patent [19]
Watanabe

[11] Patent Number: 4,719,984
[45] Date of Patent: Jan. 19, 1988

[54] DRIVE AND BRAKING SYSTEM FOR VEHICLE

[75] Inventor: Hiromitsu Watanabe, Iwata, Japan

[73] Assignee: Yamaha Hatsudoki Kabushiki Kaisha, Japan

[21] Appl. No.: 933,321

[22] Filed: Nov. 19, 1986

Related U.S. Application Data

[63] Continuation of Ser. No. 699,203, Feb. 5, 1985, abandoned.

[30] Foreign Application Priority Data

Feb. 6, 1984 [JP] Japan ............................. 59-18416

[51] Int. Cl.⁴ ............... B62M 17/00; B60K 17/24
[52] U.S. Cl. ........................ 180/226; 180/215; 180/73.1; 188/18 A; 192/4 A
[58] Field of Search .............. 180/70.1, 73.1, 75, 180/215, 217, 219, 226; 188/2 R, 18 A; 192/4 A, 18 R

[56] References Cited

U.S. PATENT DOCUMENTS

| | | | |
|---|---|---|---|
| 2,377,124 | 5/1945 | Ballamy | 180/226 |
| 2,959,449 | 11/1960 | Lazich | 188/2 R X |
| 3,108,481 | 10/1963 | Westmont | 180/70.1 X |
| 3,183,999 | 5/1965 | Buyze et al. | 188/18 A |
| 3,348,643 | 10/1967 | Townsend | 192/4 A X |
| 3,386,532 | 6/1968 | Moss | 192/4 A X |
| 4,064,957 | 12/1977 | Parham | 180/215 |
| 4,330,045 | 5/1982 | Myers | 188/18 A X |
| 4,363,384 | 12/1982 | Richardson et al. | 188/18 A X |
| 4,436,173 | 3/1984 | Takahashi | 180/226 |

FOREIGN PATENT DOCUMENTS

| | | | |
|---|---|---|---|
| 58-136563 | 8/1983 | Japan | 180/215 |
| 119192 | 9/1918 | United Kingdom | 180/65.7 X |

Primary Examiner—John J. Love
Assistant Examiner—Charles R. Watts
Attorney, Agent, or Firm—Ernest A. Beutler

[57] ABSTRACT

An improved drive and braking arrangement for an off the road single rider multi-wheeled vehicle. The drive arrangement includes a shaft drive and the brake includes a brake disk that is fixed for rotation with the drive shaft. The brake disk is contained within a housing for its protection and the housing is made up of two pieces, one of which is affixed to a tube that contains the drive shaft and is affixed to the engine and the other of which is affixed to a tube that forms a portion of the final drive.

8 Claims, 7 Drawing Figures

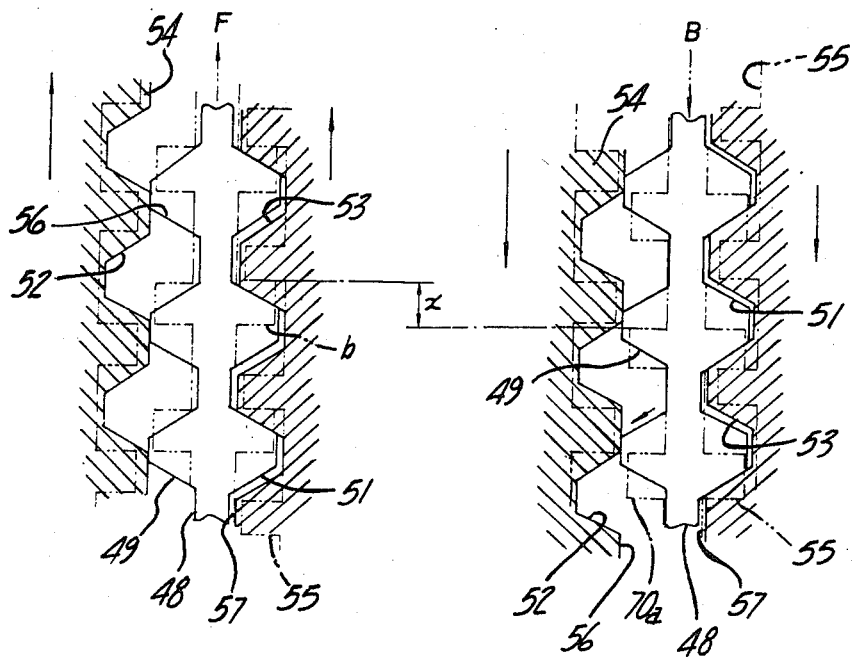

DRIVE AND BRAKING SYSTEM FOR VEHICLE

This is a continuation of U.S. patent application Ser. No. 699,203, filed Feb. 5, 1985, now abandoned.

BACKGROUND OF THE INVENTION

This invention relates to a drive and braking system for vehicles and more particularly to an improved and simplified drive and braking system for off the road type vehicles.

Recently, there has been a large demand for off the road three and four wheeled vehicles that are designed primarily to accommodate a single rider. These vehicles employ large, low pressure balloon-type tires that permit them to travel over a wide variety of terrains and are intended to be ridden primarily by a single rider. Because of this, the vehicles are extremely compact in nature and the placement of all of the necessary drive and braking components gives rise to certain problems. For example, an arrangement should be provided for effectively braking at least the rear wheels of the vehicle. However, due to the off the road type of use for which these vehicles are designed, the braking system must be robust and should be located and protected so that it cannot be damaged if obstructions come into contact with the brake assembly. In addition, the brake assembly should be such that it is located in such a manner that the actuation is facilitated without long interconnecting linkages or cables that themselves may be damaged.

It is, therefore, a principal object of this invention to provide an improved and simplified drive and braking arrangement for such a vehicle.

It is another object of this invention to provide a drive and braking system for an off the road vehicle wherein the brake is located in close proximity to the operator so as to simplify its activating mechanism.

It is a further object of this invention to provide a braking arrangement for an off the road vehicle wherein the brake is protected and yet may be readily serviced.

SUMMARY OF THE INVENTION

A first feature of this invention is adapted to be embodied in a drive and braking arrangement for a wheeled vehicle having a pair of spaced apart wheels, axle means carrying the wheels, final drive means associated with the axle means for driving the wheels, an engine and a drive shaft driven by the engine and associated with the final drive means for driving the wheels. A brake disk is fixed for rotation with the drive shaft and a housing fixed relative to either the engine or the final drive means encloses the brake disk. Brake pad means are associated with the brake disc and activating means are carried by the housing and associated with the brake pad means for activating the brake pad means to brake the brake disk.

Another feature of the invention is adapted to be embodied in a drive and braking arrangement for a wheeled vehicle having a pair of spaced apart wheels, axle means carrying the wheels, final drive means associated with the axle means for driving the wheels, an engine, and a drive shaft driven by the engine and associated with the final drive means for driving the wheels. A brake disk is fixed for rotation with the drive shaft and a brake housing is affixed against rotation and encloses the brake disk. The brake housing is formed from two pieces joined together. Brake pad means are associated with the brake disk and actuating means are carried by the brake housing for activating the brake pad means to brake the barke disc.

Yet another feature of this invention is adapted to be embodied in a drive and braking arrangement for a wheeled vehicle having frame means, a seat carried centraly by the frame means and sized to accommodate primarily a single rider and a pair of spaced apart rear wheels positioned beneath and to the rear of the seat. Axle means carry the rear wheels and final drive means are associated with the axle means for driving the rear wheels. An engine is carried by the frame means and a drive shaft is driven by the engine and is associated with the final drive means for driving the wheels. A brake disk is fixed for rotation with the drive shaft in proximity to and beneath the seat. Brake pad means are associated with the brake disk and actuating means are associated with the brake pad means for actuating the brake pad means to brake the brake disk.

BRIEF DESCRIPTION OF THE DRAWINGS

FIG. 6 is a partially schematic cross-sectional view showing the operation of the locking device associated with the final drive when in a forward driving mode.

FIG. 7 is a view, in part similar to FIG. 6, showing the operation in the reverse drive mode.

DETAILED DESCRIPTION OF THE PREFERRED EMBODIMENT

Figure 1:
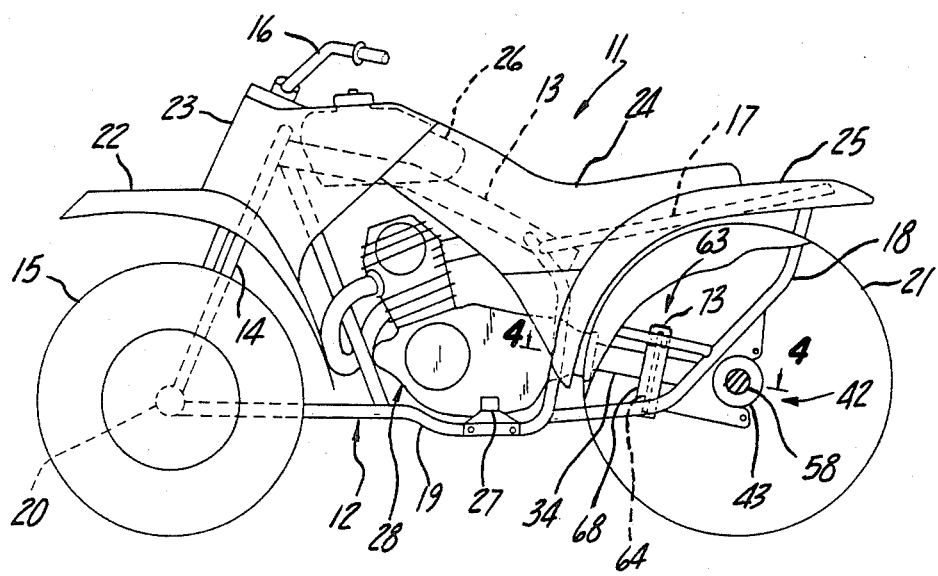
FIG. 1 is a side elevational view, with a portion broken away, of an off the road, four wheeled vehicle constructed in accordance with an embodiment of the invention.
Figure 2:
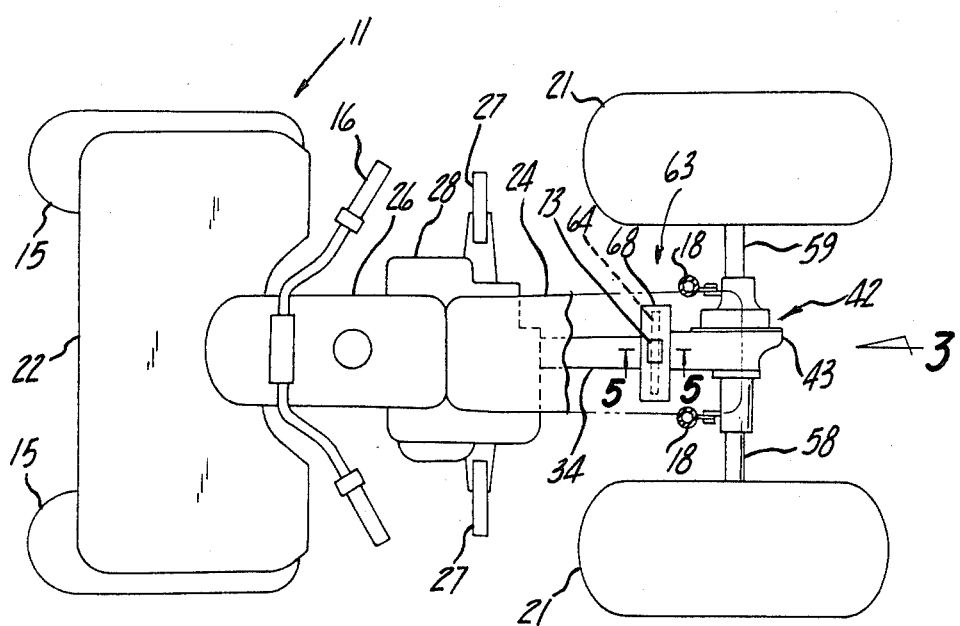
FIG. 2 is a top plan view of the vehicle, with a portion of the body and seat removed so as to more clearly show the construction.
Figure 3:
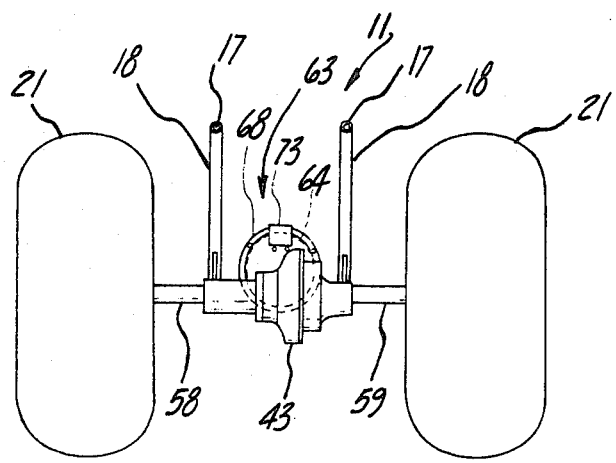
FIG. 3 is a rear elevational view looking generally in the direction of the arrow 3 in FIG. 2.

Referring first primarily to FIGS. 1 through 3, an off the road vehicle constructed in accordance with an embodiment of the invention is identified generally by the reference numeral 11. In the illustrated embodiment, as will become apparent, the vehicle 11 is of the four wheel type. It is to be understood, however, that the driving and braking arrangement, which forms the substance of the invention, is particularly adapted for use with either four or three wheeled vehicles that are designed primarily to accommodate a single rider.

The vehicle 11 includes a frame assembly 12 which may be of any known type and, in the illustrated embodiment, is of the welded up tubular type including a main tube 13 that extends generally horizontally and rearwardly from a head tube 14. A pair of front wheels carrying low pressure, balloon tires 15 are supported for rotation by an axle 20 at the lower end of the head tube 14 as well as for steering movement. The front wheels 15 are steered by means of a handlebar assembly 16, which is journaled at th upper end of the head tube 14 and which is coupled for steering movement to the wheels 15 in any known manner.

A pair of seat rails 17 extend rearwardly from the main tube 13 in transversely spaced apart relationship. The rear ends of the seat tubes 17 are supported at the upper end of seat pillar rails 18 that extend downwardly and horizontally where they are joined to transversely spaced apart down tubes 19 of the frame assembly 12. A pair of rear wheels carrying low pressure, balloon tires 21 are supported at the rear end of the frame assembly 12 in a manner to be described.

A body assemblage is contained on the frame 12 and is comprised of a front fender 22 that overlies at least, in part, the front wheels 15 and which is connected to a forward cowling portion 23. A seat 24 is carried by the frame assembly 12 over the rear portion of the main tube 13 and by the seat rails 17. The seat 24 is adapted and sized so as to handle primarily a single rider and is positioned centrally of the frame 12, above and forwardly of the rear wheels 21. A rear fender assembly 25 is positioned rearwardly of the seat 24 and beneath it and covers the forward and upper portion of the rear wheels 21. A fuel tank 26 is also carried by the frame assembly and specifically the main tube 13 rearwardly of the head tube 14.

A pair of spaced apart foot pegs 27 are carried by the down tubes 19 and are positioned so as to accommodate the feet of a rider in a comfortable position.

Referring now additionally to the remaining figures, the means for powering the vehicle 11 will be described. This includes an internal combustion engine, indicated generally by the reference numeral 28 that is supported by the frame assembly 12 beneath the fuel tank 26 and seat 24. The engine 28 may be of any known type and preferably is of the motorcycle type that includes a combined change speed transmission, crankcase assembly so that the engine 28 has its output shaft driven at a plurality of speed ratios. An output shaft 29 of the transmission (FIG. 4) carries a bevel gear 31 that is in mesh with a driven bevel gear 32 that is fixed to the forward end of a drive shaft 33. This end of the drive shaft is contained within a protective housing of a generally cylindrical or tubular configuration 34 that is affixed at its forward end in any suitable manner to the rear end of the crankcase transmission assembly of the engine 28.

A coupling 35 is affixed to the rear end of the drive shaft 33 by means of a spline connection and nut 36. The coupling 35 has external splines 37 that are in mesh with internal splines formed on a further coupling 38. The coupling 38 also has a splined portion that is drivingly engaged with a forwardly splined end 39 of a pinion shaft 41. The pinion shaft 41 forms a portion of the final drive assembly, indicated generally by the reference numeral 42. The final drive assembly 42 includes a split casing 43 that has a cylindrical forward portion 44 that carries bearings 45 for journaling the pinion shaft 41. The pinion shaft 41 has an integral pinion gear 44 that is in mesh with a ring gear 46 that is contained within the housing 43 and is journaled by an anti-friction bearing 47 within this housing.

The ring gear 46 is suitably fixed for rotation with an internal cam ring 48 which, as best shown in FIGS. 6 and 7, has oppositely facing driving lugs 49 and 51. The lugs 49 and 51 are adaptd to be received in corresponding shaped recesses 52 and 53, respectively, of a pair of driven collars 54 and 55. The collars 54 and 55 have, in turn, flattened surfaces 56 and 57 that are adapted at times to pass over respective flats formed on the lugs 49 and 51 of the driving cam 48 for a reason to be described.

The collar 54 has a splined engagement with the internal end of a first axle shaft 58 to which one of the rear wheels 21 is affixed in a suitable manner. The splined engagement permits axle movement of the collar 54 relative to the axle shaft 58. In a similar manner, the collar 55 has a splined connection to a second axle shaft 59 that carries the remaining rear wheel. Again, axial movement is permitted between the collar 55 and the axle shaft 59. Paris of respective coil compression springs 61 and 62 act between the ends of the axle shafts 58 and 59 and the collars 54 and 55 so as to urge the collars 54 and 55 axially inwardly so that their respective recesses 52 and 53 will receive the lugs 49 and 51 of the driving cam 48.

The cooperation of the cam ring 48 with the collars 54 and 55 operates to provide a locking differential type operation. For example, if driving in a forward direction F (FIG. 6) and rounding a curve to the right, the left hand wheel 21 will tend to rotate faster than the wheel 21 at the right hand side. This is permitted since the collar 54 may move axially against the action of the spring 61 so as to cause the cam lugs 49 to moe out of the recesses 52 and pass the flats 56. The collar 55 is, however, maintained in engagement so that the driving forces will be delivered predominantly through the right hand side wheel.

In a similar manner, if travelling in reverse as indicated by the arrow B in FIG. 7, and turning in the same direction, the wheel 21 at the outside may overrun due again to compression of the spring 61 and movement of the collar 54 out of engagement with the cam ring 48. Differential action when turning in the other direction is believed to be readily apparent.

In accordance with an embodiment of the invention, the vehicle 11 is provided with a disk brake assembly, indicated generally by the reference number 63. The disk brake assembly 63 is positioned on and operates through the drive shaft 33 and final drive so as to simplify the assembly. In addition, the disk brake assembly 63 is positioned in proximity to the foot pegs 27 so that its actuating mechanism may be positioned adjacent the foot pegs and a simplified arrangement may be employed for actuating the brake mechanism.

Figure 5:
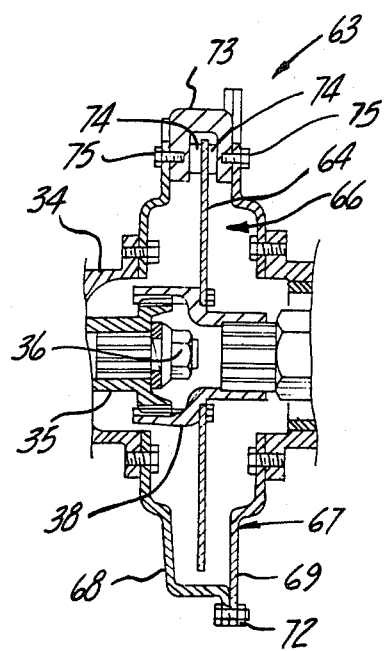
FIG. 5 is an enlarged cross-sectional view taken along the line 5—5 of FIG. 2 and shows the braking arrangement at a plane perpendicular to the plane of FIG. 4.
Figure 4:
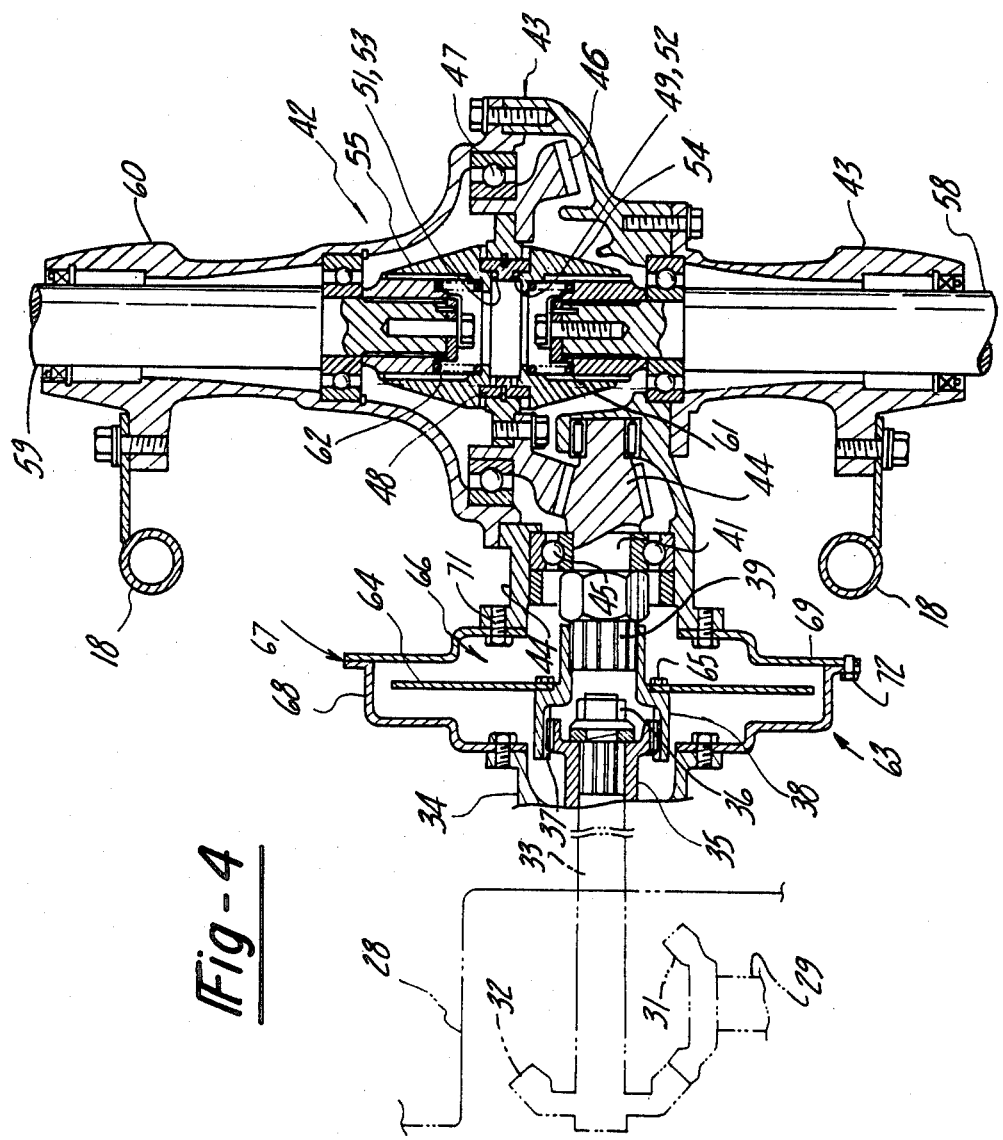
FIG. 4 is an enlarged cross-sectional view taken generally along the line 4—4 in FIG. 1, showing the final drive and braking arrangement.

The brake assembly 63 is shown in most detail in FIGS. 4 and 5 although it also appears in FIGS. 1 through 3. It is comprised of a brake rotor or disk 64 that is affixed for rotation with the drive shaft 33. One convenient way in which this may be done is by affixing the brake disk 64 to a shoulder of the coupling 33 by means of threaded fasteners 65.

In order to protect the brake disk 64 (which is important because of th off the road use), the disk 64 is contained within a cavity 66 of a protective outer housing, indicated generally by the reference numeral 67. The outer housing 67 is comprised of a first housing member 68 that is affixed relative to the engine 28 and specifically to the tube 34 which surrounds the drive shaft 33. A second housing piece 69 completes the housing 67 and is affixed to the tubular portion 44 of the final drive housing 43 by means of threaded fasteners 71. The housing portions 68 and 69 have mating faces that are juxtaposed to the disk 64 and which are affixed together by threaded fasteners 72.

The upper portion of the housing 67 is formed with an opening in which a caliper member 73 is affixed and supported. The caliper member 73 supports a pair of axially spaced disk brake pads 74, each disposed on an opposite side of the brake disk 64, and incorporates suitable mechanical actuating means for bringing the brake pads 74 into frictional engagement with the brake disks 64 so as to halt its rotation. This actuating means is operated, as aforenoted, by a suitable pedal or operator located adjacent one or both of the foot pegs 27.

It should be readily apparent from the foregoing description that a highly effective and relatively simple disk brake assembly is provided for an off the road vehicle which is located close to its actuator and which will be well protected when operating in rough terrains. In addition, the construction is such that servicing is easily facilitated. For example, the brake pads 74 may be conveniently replaced by withdrawing bolts 75 that hold the caliper 73 to the housing 67. As has been noted, the invention is disclosed in conjunction with a four wheel off the road vehicle but the invention is equally susceptible of use in three wheel vehicles. In addition, various other changes and modifications may be made without departing from the spirit and scope of the invention, as defined by the appended claims.

What is claimed is:

1. A wheeled vehicle drive and braking arrangement, said wheeled vehicle having a generally open frame, at least one dirigible front wheel supported at a forward end of said frame, a saddle type seat carried by said frame to the rear of said front wheel and adapted to carry a rider seated thereon in straddle fashion, a pair of spaced apart rear wheels to the rear of said seat, axle means journaled by said frame and carrying said rear wheels, final drive means for driving said axle means and therby driving said wheels, said final drive means including an outer housing carried by said frame, an engine spaced from said final drive means and positioned beneath and forwardly of said seat, said engine having an outer housing carried by said frame and spaced from said final drive means for driving said wheels, a drive shaft extending longitudinally of said vehicle between said engine and said final drive means through an open portion of said frame, a brake disk fixed for rotation with said drive shaft beneath said seat, an exposed brake housing fixed against rotation directly to at least one of said engine and said final drive means outer housings but spaced outwardly thereof and enclosing said brake disk, brake pad means and actuator means carried by said brake housing and cooperating with said brake pad means for actuating said brake pad means to brake said brake disk, said brake pad means and said brake sidk constituting the sole brake acting upon said rear wheels.

2. A drive and braking arrangement as set forth in claim 1 wherein the brake housing is fixed to a tube encircling the drive shaft and fixed relative to the engine outer housing.

3. A drive and braking arrangement as set forth in claim 1 wherein the brake housing is fixed directly to an outer housing of the final drive means.

4. A drive and braking arrangement as set forth in claim 3 wherein the brake housing is fixed to a tubular member housing portion of the final drive means.

5. A drive and braking arrangement as set forth in claim 3 wherein the brake housing is of a two piece construction.

6. A drive and braking arrangement as set forth in claim 5 wherein one of the pieces of the brake housing is affixed to the final drive housing and the other of the brake housing pieces is affixed to one end of a tube containing the drive shaft and fixed relative to the engine.

7. A drive and braking arrangement as set forth in claim 6 wherein the brake housing pieces have mating faces substantially aligned with the brake disk.

8. A drive and braking arrangement as set forth in claim 1 further including operator means for operating the actuator means and actuating the brake.

* * * * *